United States Patent [19]

Pearl

[11] 4,091,701
[45] May 30, 1978

[54] CUTTING MACHINE HAVING ROLLER BLADE GUIDE

[75] Inventor: David R. Pearl, West Hartford, Conn.

[73] Assignee: Gerber Garment Technology, Inc., South Windsor, Conn.

[21] Appl. No.: 737,736

[22] Filed: Nov. 1, 1976

[51] Int. Cl.² ............................ D06H 7/00; B26D 1/10
[52] U.S. Cl. .......................................... 83/747; 83/762; 83/635; 83/925 CC
[58] Field of Search ................ 83/925 CC, 635, 747, 83/783, 761–767, 824–826, 820; 30/275, 273

[56] References Cited

U.S. PATENT DOCUMENTS

| 245,149 | 8/1881 | Fowler | 83/925 CC |
|---|---|---|---|
| 245,150 | 8/1881 | Fowler | 83/925 CC |
| 843,097 | 2/1907 | Rathke | 83/824 |
| 876,266 | 1/1908 | Cassity | 83/763 |
| 1,690,808 | 11/1928 | Appelbaum | 30/273 |
| 2,152,906 | 4/1939 | Miller | 83/825 |
| 3,548,699 | 12/1970 | Gerber | 83/925 CC |
| 3,643,536 | 2/1972 | Alexander | 83/820 |
| 3,841,187 | 10/1974 | Gerber et al. | 83/925 CC |

*Primary Examiner*—J. M. Meister
*Attorney, Agent, or Firm*—McCormick, Paulding & Huber

[57] ABSTRACT

A cutting machine having a table on which multi-ply layups of sheet material are positioned during cutting operations utilizes a reciprocating cutting blade that is suspended in cantilevered fashion above the table and lowered into cutting engagement with the material during cutting. The sheet material and blade are moved relative to one another while the blade is oriented to remain tangent to predefined cutting paths followed through the material. A blade guide is mounted in a presser foot which slides over the material, and several guide rollers in the blade guide engage the sides and trailing edge of the blade to control blade positioning immediately above the sheet material.

16 Claims, 7 Drawing Figures

CUTTING MACHINE HAVING ROLLER BLADE GUIDE

BACKGROUND OF THE INVENTION

The present invention relates to cutting machines of the type used for cutting pattern pieces from single of multi-ply layups of sheet material. More particularly, the present invention is concerned with a roller guide for controlling the positioning of a reciprocating cutting blade suspended in cantilevered fashion above the sheet material while the blade is advanced along predefined cutting paths.

Cutting machines for cutting pattern pieces from multi-ply layups of sheet material have been in existence for some time. U.S. Pat. No. 3,955,458 issued on May 11, 1976 and having the same assignee as the present invention illustrates one such cutting machine having a reciprocating cutting blade suspended in cantilever fashion over a support table on which the sheet material is held in a spread condition during cutting. The cutting blade is an elongated, thin, flat blade having a sharp, leading cutting edge which is advanced through the layup along predefined cutting paths at the periphery of the pattern pieces. During cutting, the blade must be rotated about its axis of reciprocation, or a similar, parallel axis, in order to remain generally tangent to the cutting path at each point. In the referenced patent, the blade is freely rotatable about such axis and is engaged at its upper end and lower or depending end by means of friction guides, usually formed from a tungsten carbide material for extended life, to establish perpendicularity of the blade and sheet material and to control blade orientation.

It has been found that in cutting deep layups of sheet material or even medium layups of relatively tough material such as denim, significant heat is generated due to friction. First of all, there is friction between the sheet material and blade which generates heat. There is also friction between the carbide guides and the blade. Since the guides are generally mounted in a presser foot which slides over the cloth, heat generated between the foot and cloth raises the temperature of the environment of the guides which interferes with heat transfer away from the blade. The increased temperatures of the blade resulting from the several different sources of friction-generated heat adversely affect the ease with which the blade reciprocates through sheet material, and can reach a point where the material is damaged.

During cutting there are also significant loads applied to the cutting blade from the sheet material, and such loads multiply rapidly in magniture when the cutting blade is not correctly oriented and positioned as it moves through the material. Misorientation of only a few degrees creates side loads which can bend or possibly break an advancing blade. Slight torsional twisting of the blade about its longitudinal axis results in the depending tip of the blade being oriented and traveling in a slightly different direction through lower plies of the layup than the mid portion of the blade traveling through the upper plies of the layup. Such twisting, therefore, produces a relatively unstable condition with the different portions of the blade tending to travel in diverging cutting paths. Blade bending or fracture is again the result.

Slight errors in blade positioning and the loads applied to the blade create errors in the patterns being cut and also cause further increases in the heat generated and the loads themselves. As the loads increase, balde bending and twisting increases. Thus, the overall situation deteriorates progressively and results in cutting errors and damage to the cutting blade or other cutting equipment and the material being cut.

It is, accordingly, a general object of the present invention to improve the cutting operations by providing a cutting machine with an improved blade guide for more accurately controlling the positioning of the blade during cutting.

SUMMARY OF THE INVENTION

The present invention resides in a blade guide for a cutting machine such as used for cutting pattern pieces from multi-ply layups of sheet material. The blade guide is mounted in a foot for guiding blade movement at a position immediately above the sheet material.

The guide includes first and second side rollers which are disposed adjacent the respective broad sides of the cutting blade and which are preferably preloaded against the blade to insure that the blade orientation is accurately controlled. A back roller is also mounted in the guide and engages the rear or trailing edge of the cutting blade to reinforce the blade against cutting forces and at the same time reduce friction-generated heat.

Preferably two pairs of side rollers are located in engagement with each flat side of the blade to eliminate blade bending. The back roller is preferably situated in the same vicinity as the side rollers, and is advantageously located at a point midway between the two pairs.

The roller guide of the present invention produces unexpectedly improved results in cutting operations with deep layups or tough materials. Such results are believed to come about due to two independent effects of the guide. Firstly, the rollers themselves significantly reduce friction loads from the levels that prevail with the prior art tungsten carbide guides. Secondly, the rollers provide more accurate positioning of the blade than the prior art guides especially if the rollers are preloaded against the blade. Forward motion of the cutting blade and blade orientation are coordinated more accurately. Where two pairs of side rollers are employed, the cutting blade is less subject to bending. With the improved guide situated in a foot immediately above the sheet material, blade guides at upper portions of the blade and the drive mechanism receive less loading. Accordingly, reduced blade loads and less heat are generated. The overall cutting operation is significantly improved in accuracy and greater cutting speeds are permitted.

DESCRIPTION OF THE PREFERRED EMBODIMENTS

Figure 1:
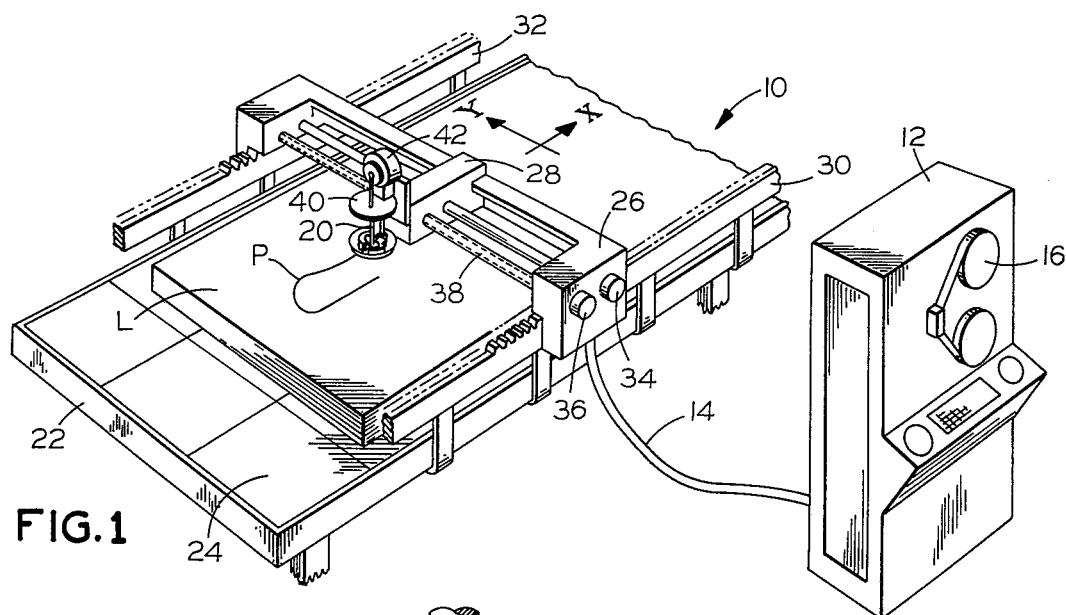
FIG. 1 is a perspective view of an automatically controlled cutting machine utilizing the improved blade guide of the present invention.

FIG. 1 illustrates an automatically controlled cutting machine, generally designated 10, of the type shown and described in greater detail in U.S. Pat. No. 3,495,492 having the same assignee as the present invention. Such cutting machine 10 is utilized to cut multi-ply layups L of sheet material such as woven and nonwoven fabrics, paper, cardboard, leather, rubber and synthetics. The illustrated machine 10 is a numerically controlled machine connected with a controller 12 by means of an electrical cable 14. The controller 12 takes data from a program tape 16 and converts that data into machine commands for guiding a reciprocating cutting blade 20 along a cutting path P defined by the program tape 16. The cutting path may, for example, be the periphery of a pattern piece forming part of a garment or a panel of upholstery.

The cutting machine 10 includes a table 22 having a penetrable bed 24 defining the support surface for the layup L during cutting. The bed 24 may be comprised of a Styrofoam material or preferably a bed of bristles which are easily penetrated by the reciprocating cutting blade 20 without damage to either while the cutting path P is traversed. The bed may also employ a vacuum system such as illustrated and described in greater detail in the above referenced U.S. Pat. No. 3,495,492 for holding the layup firmly in position.

The cutting blade 20 is suspended above the support surface of the table 22 by means of an X-carriage 26 and a Y-carriage 28. The X-carriage 26 translates back and forth in the illustrated X coordinate direction on a set of racks 30 and 32 which are engaged by an X-drive motor 34 energized by command signals from the controller 12. The Y-carriage 28 is mounted on the X-carriage 26 for movement relative to the X-carriage in the Y coordinate direction and is translated by the Y-drive motor 36 and a lead screw 38 connected between the motor and carriage. Like the drive motor 34, the drive motor 36 is also energized by command signals from the controller 12. Thus coordinated movements of the carriages 26 and 28 can translate the cutting blade 20 along a cutting path over any area of the table 22.

The cutting blade 20 is suspended in cantilever fashion from a platform 40 attached to the projecting end of the Y carriage 28 for elevating the sharp, leading cutting edge of the blade into and out of cutting engagement with the layup of sheet material on the table 22. The blade 20 is reciprocated by means of a drive motor 42 also supported on the platform 40.

Figure 2:
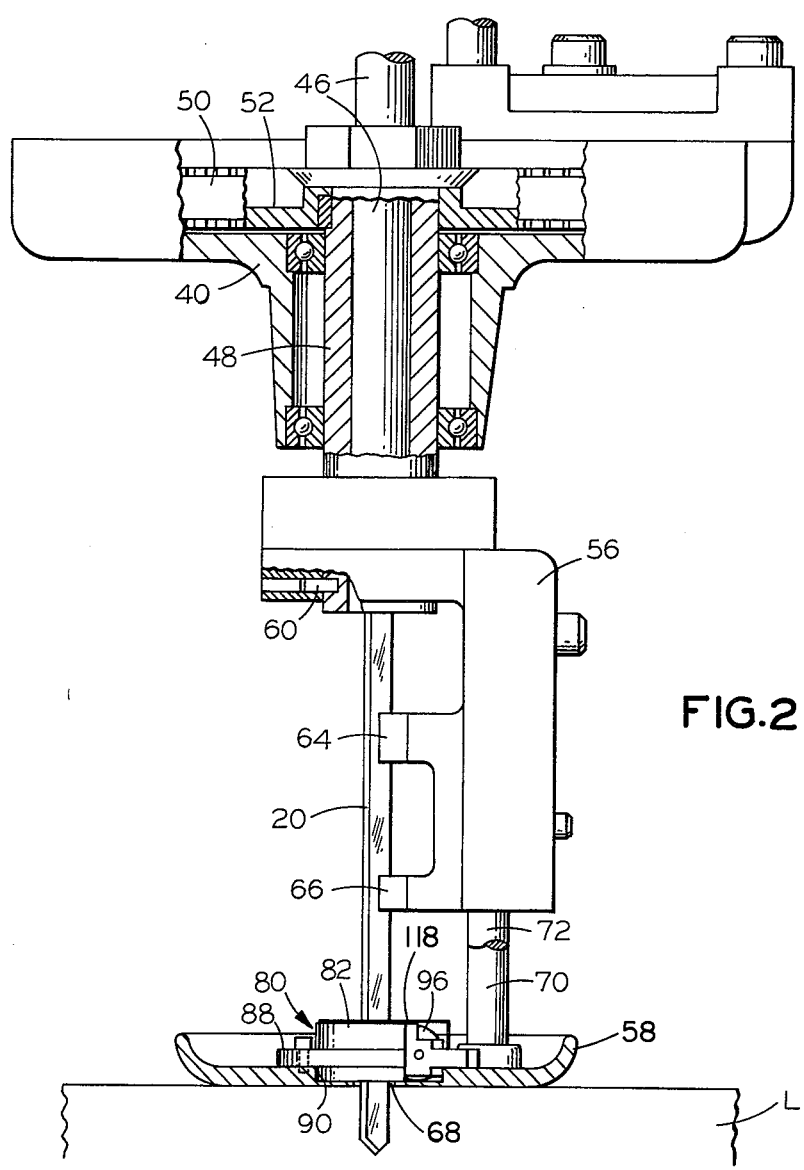
FIG. 2 is a fragmentary view of the cutting blade and associated supporting and positioning apparatus including the blade guide of the present invention.
Figure 3:
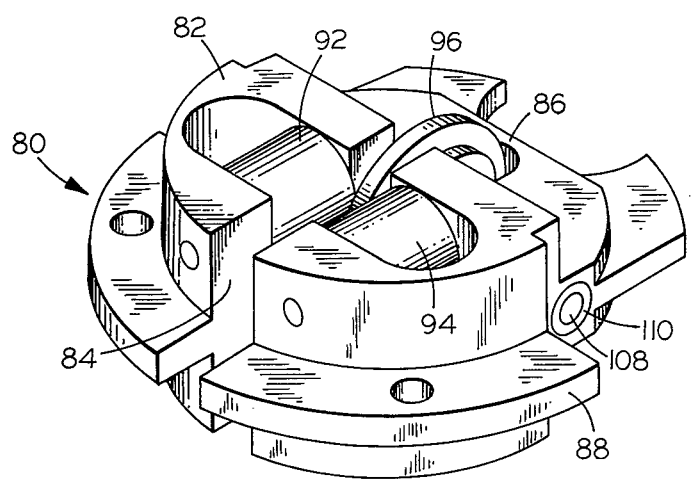
FIG. 3 is an enlarged perspective view of the improved blade guide.

As shown in greater detail in FIG. 2, a reciprocating drive linkage 46 from the motor 42 extends downwardly through a support shaft 48 that is rotatable within the lower portion of the platform 40. The drive linkage connects with the cutting blade 20 within the shaft 48 to produce reciprocating movement of the cutting blade during the cutting operation. The linkage also contains a swivel connection (not shown) which permits the cutting blade 20 to rotate with the shaft 48 independently of the linkage 46.

The support shaft 48 at its upper end is connected with a toothed belt 50 and drive pulley 52. The pulley is keyed to the shaft to control shaft rotation in accordance with commands derived from the controller 12. Such commands are applied to a drive motor (not shown) connected with the belt 50.

An upper blade guide 56, and a presser foot 58 are suspended for rotation from the lower end of the support shaft 48 and are held in registration with the shaft by pin 60. The cutting blade 20 is engaged near its upper trailing portion by means of two bifurcated friction guides 64 and 66 forming part of the upper blade guide 56. The guides 64 and 66 are preferably made of tungsten carbide material for high-wear resistance with the reciprocating cutting blade. Accordingly, orientation of the upper blade guide and presser foot about the axis of reciprocation of the blade 20 is controlled by the dirve belt and controller 12.

The presser foot 58 has a central slot 68 in the base through which the blade projects and reciprocates during cutting. The presser foot is translated with the blade and is rotated about the axis of reciprocation by means of two support posts 70 and 72. The posts project upwardly into the guide 56 and are received in sliding relationship within corresponding bores of the guide. During cutting the presser foot normally rests under its own weight on the layup L and holds the upper plies of the layup down.

For a more detailed illustration and description of the blade drive and supporting mechanism, reference is made to the above-identified U.S. Pat. No. 3,955,458.

In accordance with the present invention, a roller guide 80 is mounted in a central portion of the presser foot 58 to guide and control the positioning of the reciprocating cutting blade 20 during the cutting operation. FIGS. 3–6 illustrate the roller guide 80 in greater detail.

Figure 4:
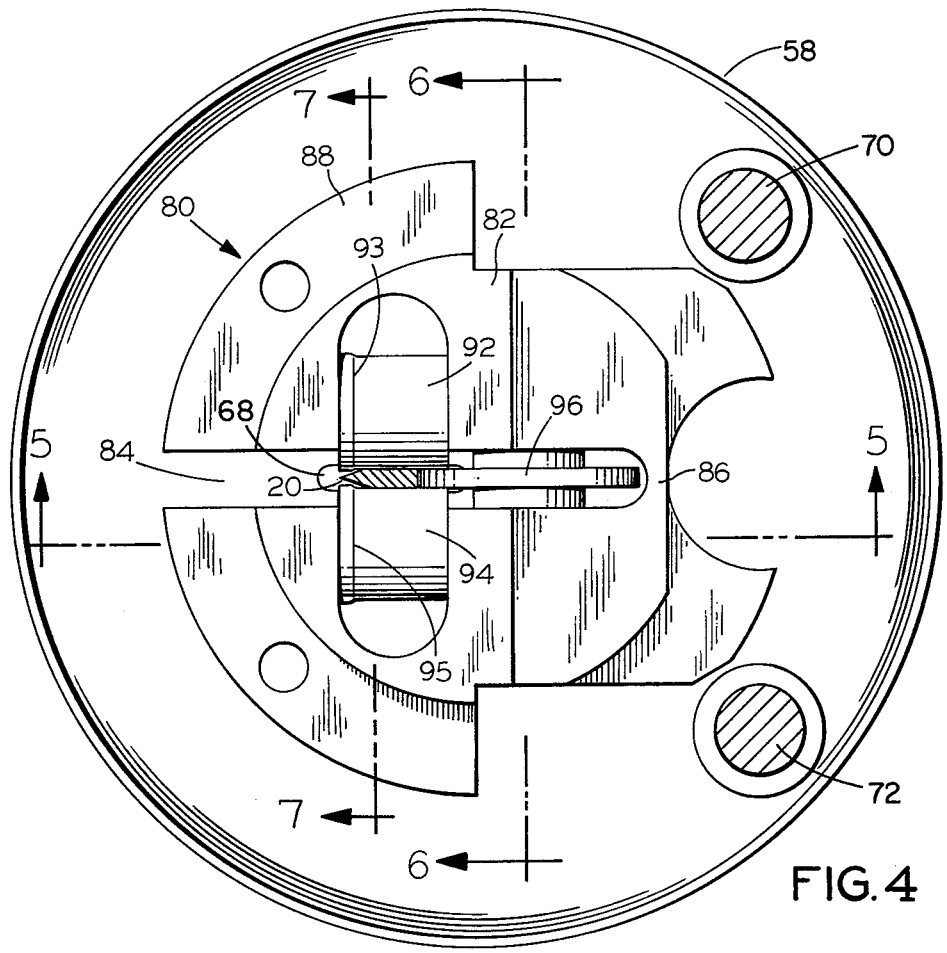
FIG. 4 is a top plan view of the improved blade guide.

The guide is comprised of a generally C-shaped frame 82 whose shape is most clearly illustrated in the plan view of FIG. 4. The gap or opening 84 of the C-shape is situated diametrically opposite a reduced wall portion 86 which weakens the frame in order to allow slight flexing of the frame and closing of the opening 84 as explained in greater detail below. A mounting flange 88 circumscribes most of the frame to attach the guide within a central recess 90 in the presser foot 58 by means of clamping bolts 89 as shown in FIG. 2.

In the upper portion of the frame 82 are two oppositely disposed side rollers 92 and 94 having axes of rotation extending generally parallel to the direction in which the blade 20 is oriented. A back roller 96 is also mounted in the C-frame for rotation about an axis extending in a direction generally perpendicular of the blade 20 as shown in FIG. 4. The side rollers 92 and 94 engage the generally flat broad sides of the thin cutting blade 20 between the sharp leading edge and the trailing edge while the back roller 96 engages the straight trailing edge in the vicinity of the rollers 92 and 94.

Figure 7:
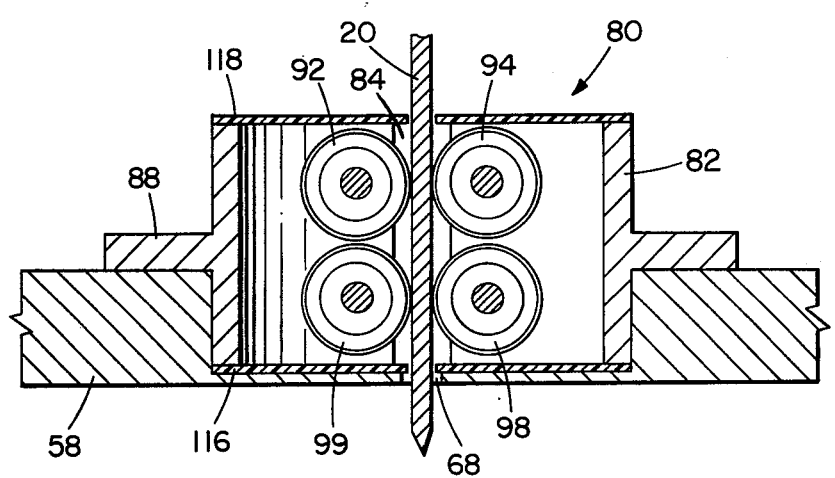
FIG. 7 is a sectional view of the blade guide as seen along the sectioning line 7—7 in FIG. 4.

As shown in the sectional elevation of FIG. 7, another side roller 98 is mounted in the frame 80 immediately below and in parallel relationship with the roller 94. Still another roller 99 (FIG. 7) is mounted in the frame immediately below the roller 92 precisely adjacent the roller 98. The lower pair of rollers 98 and 99 engage the flat broad sides of the blade 90 in the same manner as the upper pair of rollers 92 and 94. Thus, the frame 80 includes two pairs of side rollers which engage the blade 20 at spaced stations to prevent blade bending and to position and hold the blade vertically along the axis of reciprocation without undue loading of the upper friction guides 64 and 66. The back roller 96 midway between the upper and lower pairs of side rollers braces the blade against cutting forces generated as the blade advances through the sheet material.

Preferably, the side rollers are slightly preloaded into engagement with the cutting blade to ensure that the space between the rollers is not greater than the blade thickness and no blade twisting occurs. It has been found, for example, with friction blade guides that a clearance as small as 0.001 inch (0.025mm) allows one degree of blade rotation. Such a small amount of rotation is, nevertheless, sufficient to create significant errors in the cutting path traveled by the blade 20. Preloading with prior art friction blade guides is not possible and when such prior art guides become worn, significant tracking error sometimes results in destruction of the blade.

Preloading of the side rollers against the blade is obtained by flexing the wall portion 86 and slightly closing the frame opening 84 located symmetrically of the central plane between the side rollers. Clamping bolts 89 engaging the flange 88 secure the guide in the preloaded condition or, alternately, a screw bridging the opening 84 can be provided to make fine adjustments of the preloading forces. In order to insure long life of the preloaded rollers, they are preferably made from hardened steel, tungsten carbide or similar hardened metals for wear resistance.

Figure 5:
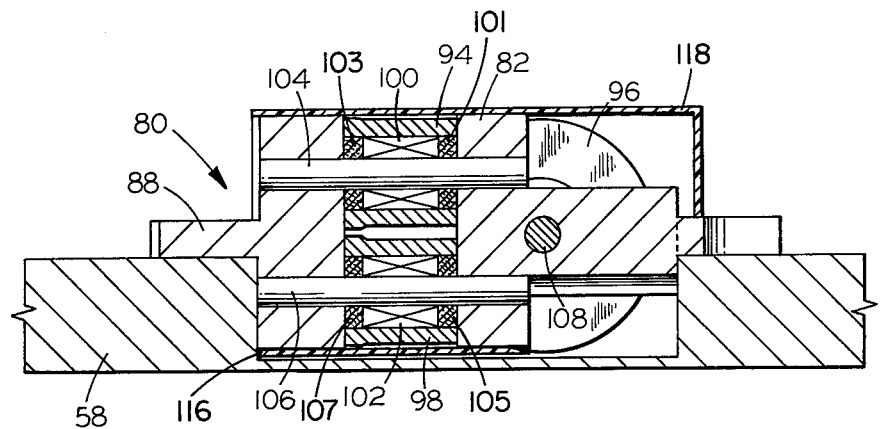
FIG. 5 is a sectional view of the blade guide as seen along the sectioning line 5—5 in FIG. 4.
Figure 6:
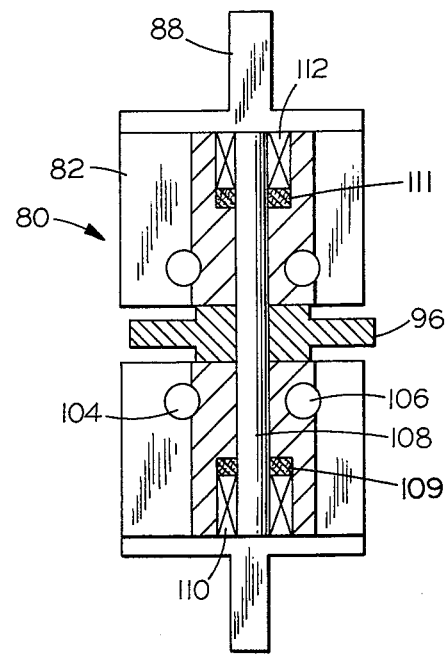
FIG. 6 is a sectional view of the blade guide as seen along the sectioning line 6—6 in FIG. 4.

To minimize friction generated between the rollers and the reciprocating cutting blade, each of the rollers is mounted by means of bearings as illustrated in the sectional views of FIGS. 5 and 6. The side rollers 94 and 98 in FIG. 5 are supported in the frame 80 by means of needle bearings 100 and 102 and pinion shafts 104 and 106 respectively. At each end of the bearing 100 are felt seals 101 and 103 which hold lubricant within the bearings and prevent grinding grit and other dirt from entering the bearing. The bearing 102 is protected by the seals 105 and 107 in the same manner. The other two side rollers are mounted in the frame in precisely the same manner. The back roller 96 in FIG. 6 is mounted on a pinion shaft 108 and the ends of the pinion shaft are in turn mounted in needle bearings 110 and 112 respectively. Each of the bearings 110 and 112 is protected by felt seals 109 and 111 respectively. Thus, friction-generated heat produced by the improved guide 80 is greatly reduced from that developed by the prior art friction guides.

The side rollers may be tapered or provided with contours profiles, such as the raised ridges 93 and 95 in FIG. 4, generally matching the contours of the blade sides. By placing the contoured ridges at axial stations along the roller adjacent the leading edge of the blade and providing the ridges with angular slopes generally matching the sharp, cutting edge of the blade, the blade can be held in a slot defined by the side rollers including the ridges and the back roller. The blade is then restrained against bending or other blade motion in the fore and aft plane of the blade. The nip of the upper rollers 92 and 94 also serves as a guide for directing the reciprocating blade downwardly into the slot between the various rollers when the blade is lowered from an elevated position to a position in cutting engagement with the sheet material.

To further protect the blade guide, a relatively thin plastic shield or cover 116 is cemented or otherwise attached to the bottom side of the frame 82 and an upper cover 118 is positioned over the upper side of the frame. Each of the plastic covers is provided with a slot through which the blade 20 reciprocates as illustrated most clearly in FIG. 7. Preferably, the width of the slot in the covers is only slightly larger than the thickness of the blade to insure that lint and other dirt does not enter the interior spaces of the frame where the bearings for the rollers are situated.

The improved blade guide 80 offers unexpectedly improved performance of the cutting blade in heavy or tough layups of sheet material such as cotton denim. The rollers maintain the positioning of the blade immediately above the layup so that the blade under loads of 30 pounds or more is guided more accurately along the cutting path. At the same time, the rollers produce less friction so that the blade can operate at lower temperatures or higher speeds without failure.

While the present invention has been described in a preferred embodiment, it should be understood that numerous modifications and substitutions can be had without departing from the spirit of the invention. For example, the back roller 96 as illustrated has a peripheral portion projecting into the opening between the side rollers although the back roller could merely extend across the opening to the rear of the side rollers. While the C-shaped frame offers the advantage of permitting the preload on the blade to be adjusted, a multi-piece frame could offer the same advantages. The roller guides may be used with either single piece or composite blades as long as blade positioning by the side rollers can be controlled. Accordingly, the present invention has been described in a preferred embodiment by way of illustration rather than limitation.

I claim:

1. In combination in a cutting machine having a support surface on which sheet material is positioned during a cutting operation, a thin, elongated cutting blade having a sharp leading cutting edge, a straight trailing edge and two broad sides between the leading and trailing edges, and a foot positioned immediately above the sheet material and through which the elongated cutting blade moves and extends into the sheet material during a cutting operation, the improvement comprising:

a blade guide mounted in the foot for guiding blade movement during cutting including a first contoured side roller disposed in the guide adjacent one of the broad sides of the blade, a second contoured side roller disposed adjacent the other of the broad sides of the blade, and a back roller adjacent the trailing edge of the blade, the first and second contoured side rollers having parallel axes of rotation and being spaced to guide the blade as the blade moves therebetween, the back roller having an axis of rotation extending transverse to the blade and perpendicular to the parallel axes of the side rollers, the first, second and back rollers all being mounted in the foot on pinions for free rotation in the foot against the blade, the contoured side rollers having raised ridges at axial stations adjacent the leading edge of the blade, the ridges being contoured to generally match the shape of the blade at the leading edge for holding the blade in a blade slot formed by the side and back rollers.

2. The improvement of claim 1 wherein the first side roller is situated at one side of the cutting blade directly opposite the second side roller.

3. In combination in a cutting machine, the improvement as defined in claim 1 wherein the two side rollers of the blade guide are spaced by an amount no greater than the blade thickness between the broad sides whereby the rollers engage the broad sides and define blade orientation immediately above the sheet material.

4. In combination in a cutting machine, the improvement as defined in claim 1 wherein a peripheral portion of the back roller projects between the side rollers.

5. In combination in a cutting machine, the improvement as defined in claim 1 further including a guide frame mounted to the foot, each of the rollers being mounted by means of the pinions and bearings in the guide frame.

6. The improvement of claim 5 wherein the guide frame is a C-shaped frame and the two side rollers are mounted in spaced and parallel relationship within the frame with the opening of the C-shape situated symmetrically of the central plane between the spaced and parallel side rollers.

7. The improvement of claim 6 wherein the spaced and parallel rollers are mounted within the C-shaped frame between the opening of the C-shape at one side of the frame and the back roller at the opposite side of the frame.

8. In combination in a cutting machine, the improvement as defined in claim 1 further including a third and a fourth side roller mounted on pinions for free rotation in the blade guide, the third side roller being situated adjacent one of the broad sides of the cutting blade parallel with the first side roller and the fourth side roller being situated adjacent the other of the broad sides of the cutting blade parallel with the second side roller.

9. In combination in a cutting machine, the improvement of claim 8 wherein the first and second side rollers are directly opposite each other on opposite sides of the blade and the third and fourth side rollers are directly opposite each other on opposite sides of the blade.

10. The improvement of claim 9 wherein the back roller engages the trailing edge of the cutting blade at a point along the blade midway between the first and second side rollers and the third and fourth side rollers.

11. A cutting machine for cutting multi-ply layups of sheet material in a spread condition along predefined cutting paths comprising:
a table defining a support surface on which the sheet material is held in the spread condition during cutting;
a cutting blade suspended in cantilever fashion above the support surface of the table and being reciprocable in cutting engagement with the sheet material during cutting, the depending portion of the blade having two generally flat sides, a sharp leading cutting edge and a trailing edge;
translating means connected with the table and the cutting blade for moving the blade and sheet material relative to one another along the predefined cutting paths during cutting with the sharp leading edge of the blade in advance of the trailing edge;
orientation means for rotating the cutting blade about an axis perpendicular to the sheet material to maintain the cutting blade generally tangent to the cutting path at each point and including a presser foot translated with the cutting blade immediately above and relative to the sheet material, the presser foot including a blade guide having a first two side rollers engaging the two flat sides of the cutting blade respectively to control blade orientation, the side rollers being mounted for free rotation on pinions held in the presser foot whereby rolling contact is provided between the sides of the blade and the presser foot, the surfaces of the side rollers having raised contours conforming respectively to the sides of the blade at the leading edge to form a slot holding the blade against forward motion relative to the side rollers; and a back roller in the blade guide engaging the trailing edge of the cutting blade in the vicinity of the two side rollers, the back roller also being mounted for free rotation on another pinion held in the presser foot whereby rolling contact is also provided between the trailing edge of the blade and the presser foot.

12. A cutting machine as defined in claim 11 further including two additional side rollers mounted for free rotation on pinions in the presser foot and engaging the two flat sides of the cutting blade respectively, the additional side rollers and said first two side rollers being closely positioned in the blade guide to control the positioning of the reciprocating cutting blade immediately above the sheet material.

13. The improvement as defined in claim 1 wherein the first and second side rollers are supported in the blade guide in pre-loaded engagement with the broad sides of the blade.

14. The improvement of claim 1 wherein the side rollers and the back rollers are made from a hardened metal.

15. The improvement of claim 1 wherein:
the blade guide includes a frame and bearings mounted in the frame for supporting the rollers on the pinions for rotation against the cutting blade as the blade moves through the guide; and
a protective cover is mounted adjacent the upper side of the frame and has a narrow slot accommodating the blade in closely spaced relationship to prevent dirt from entering the interior of the frame where the bearings for the rollers are mounted.

16. The improvement of claim 15 further including another protective cover mounted adjacent the lower side of the frame and having a narrow slot accommodating the blade in closely spaced relationship to prevent dirt from entering the interior of the frame.

* * * * *